US011093566B2

(12) United States Patent
Shetty et al.

(10) Patent No.: US 11,093,566 B2
(45) Date of Patent: *Aug. 17, 2021

(54) ROUTER BASED QUERY RESULTS

(71) Applicant: INTERNATIONAL BUSINESS MACHINES CORPORATION, Armonk, NY (US)

(72) Inventors: Ashrith Shetty, Belthangady (IN); Rohit S. Shetty, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 88 days.

This patent is subject to a terminal disclaimer.

(21) Appl. No.: 16/416,358

(22) Filed: May 20, 2019

(65) Prior Publication Data

US 2019/0272300 A1 Sep. 5, 2019

Related U.S. Application Data

(63) Continuation of application No. 15/399,928, filed on Jan. 6, 2017, now Pat. No. 10,372,771.

(51) Int. Cl.
G06F 16/9535 (2019.01)
(52) U.S. Cl.
CPC .............................. *G06F 16/9535* (2019.01)
(58) Field of Classification Search
None
See application file for complete search history.

(56) References Cited

U.S. PATENT DOCUMENTS

| 7,818,315 B2 | 10/2010 | Cucerzan |
| 8,543,521 B2* | 9/2013 | Yang .................... G06F 16/5866 706/12 |
| 9,305,088 B1 | 4/2016 | Zamir |
| 2002/0091923 A1* | 7/2002 | Chipman ................ G06F 16/30 713/168 |

(Continued)

FOREIGN PATENT DOCUMENTS

| CN | 102214182 A | 10/2011 |
| CN | 102231152 B | 9/2014 |

OTHER PUBLICATIONS

Bhushan et al, "Recommendation of optimized web pages to users using web log mining techniques", IEEE 2013, 4 pages.*

(Continued)

*Primary Examiner* — Uyen T Le
(74) *Attorney, Agent, or Firm* — Schmeiser, Olsen & Watts; Brian M. Restauro

(57) ABSTRACT

A method and system for improving a router based search query is provided. The method includes identifying a Web page retrieved during a Web query received from a network router device and analyzing historical Web pages retrieved during historical search queries associated with a search engine router and the network router device. The Web page is ranked with respect to the historical Web pages and the Web page is tagged with a first domain comprising a topic associated with the Web page. An address for the network router device is tagged with the first domain and additional domains comprising additional topics associated with additional Web pages accessed via the network router device. In response, the Web page is re-ranked with respect to the historical Web pages.

20 Claims, 11 Drawing Sheets

(56) References Cited

U.S. PATENT DOCUMENTS

| | | |
|---|---|---|
| 2006/0129533 A1* | 6/2006 | Purvis ................. G06F 16/9535 |
| 2010/0057726 A1* | 3/2010 | Ma ...................... G06F 16/9535 |
| | | 707/E17.014 |
| 2010/0268700 A1 | 10/2010 | Wissner |
| 2018/0196883 A1 | 7/2018 | Shetty |

OTHER PUBLICATIONS

Friedman, Mark; List of IBM Patents or Patent Applications Treated as Related; May 20, 2019; 1 page.

Shuler, Rus; How does the Internet Work?; Retrieved from the Internet on Aug. 25, 2016; URL: http://www.theshulers.com/whitepapers/internet_whitepaper/; 10 pages.

Wikipedia; Traceroute; retrieved from the Internet on Aug. 25, 2016; URL: https://en.wikipedia.org/w/index.php?title=Traceroute&printable+yes; 3 pages.

* cited by examiner

ROUTER BASED QUERY RESULTS

CROSS REFERENCE TO RELATED APPLICATIONS

This application is a continuation application claiming priority to Ser. No. 15/399,928 filed Jan. 6, 2017, now U.S. Pat. No. 10,372,771 issued Aug. 6, 2019, the contents of which are hereby incorporated by reference.

FIELD

The present invention relates generally to a method implementing a router based search query and in particular to a method and associated system for improving router search query technology by enabling router communications with respect to Web page searches.

BACKGROUND

Accurately providing network search results based on device attributes typically includes an inaccurate process with little flexibility. Analyzing current network based search results with respect past network search results associated with machine based parameters may include a complicated process that may be time consuming and require a large amount of resources. Accordingly, there exists a need in the art to overcome at least some of the deficiencies and limitations described herein above.

SUMMARY

In one embodiment, the present invention provides a router based search query improvement method comprising: identifying, by a processor of a hardware device, a Web page retrieved during a Web query received from a network router device; analyzing, by the processor executing a search engine associated with a search engine router, historical Web pages retrieved during historical search queries associated with the search engine router and the network router device; ranking, by the processor based on results of the analyzing, the Web page with respect to the historical Web pages; first tagging, by the processor, the Web page with a first domain comprising at least one topic associated with the Web page; second tagging, by the processor, an address for the network router device with the first domain; third tagging, by the processor, the address for the network router device with additional domains comprising additional topics associated with additional Web pages accessed via the network router device; and re-ranking, by the processor based on results of the first tagging, the second tagging, and the third tagging, the Web page with respect to the historical Web pages.

In another embodiment, the present invention provides a computer program product, comprising a computer readable hardware storage device storing a computer readable program code, the computer readable program code comprising an algorithm that when executed by a processor of a hardware device implements a router based search query improvement method, the method comprising: identifying, by the processor, a Web page retrieved during a Web query received from a network router device; analyzing, by the processor executing a search engine associated with a search engine router, historical Web pages retrieved during historical search queries associated with the search engine router and the network router device; ranking, by the processor based on results of the analyzing, the Web page with respect to the historical Web pages; first tagging, by the processor, the Web page with a first domain comprising at least one topic associated with the Web page; second tagging, by the processor, an address for the network router device with the first domain; third tagging, by the processor, the address for the network router device with additional domains comprising additional topics associated with additional Web pages accessed via the network router device; and re-ranking, by the processor based on results of the first tagging, the second tagging, and the third tagging, the Web page with respect to the historical Web pages.

In another embodiment, the invention provides a hardware device comprising a processor coupled to a computer-readable memory unit, the memory unit comprising instructions that when executed by the processor executes a router based search query improvement method comprising: identifying, by the processor, a Web page retrieved during a Web query received from a network router device; analyzing, by the processor executing a search engine associated with a search engine router, historical Web pages retrieved during historical search queries associated with the search engine router and the network router device; ranking, by the processor based on results of the analyzing, the Web page with respect to the historical Web pages; first tagging, by the processor, the Web page with a first domain comprising at least one topic associated with the Web page; second tagging, by the processor, an address for the network router device with the first domain; third tagging, by the processor, the address for the network router device with additional domains comprising additional topics associated with additional Web pages accessed via the network router device; and re-ranking, by the processor based on results of the first tagging, the second tagging, and the third tagging, the Web page with respect to the historical Web pages.

The present invention advantageously provides a simple method and associated system capable of accurately providing network search results based on device attributes.

DETAILED DESCRIPTION

Figure 1:
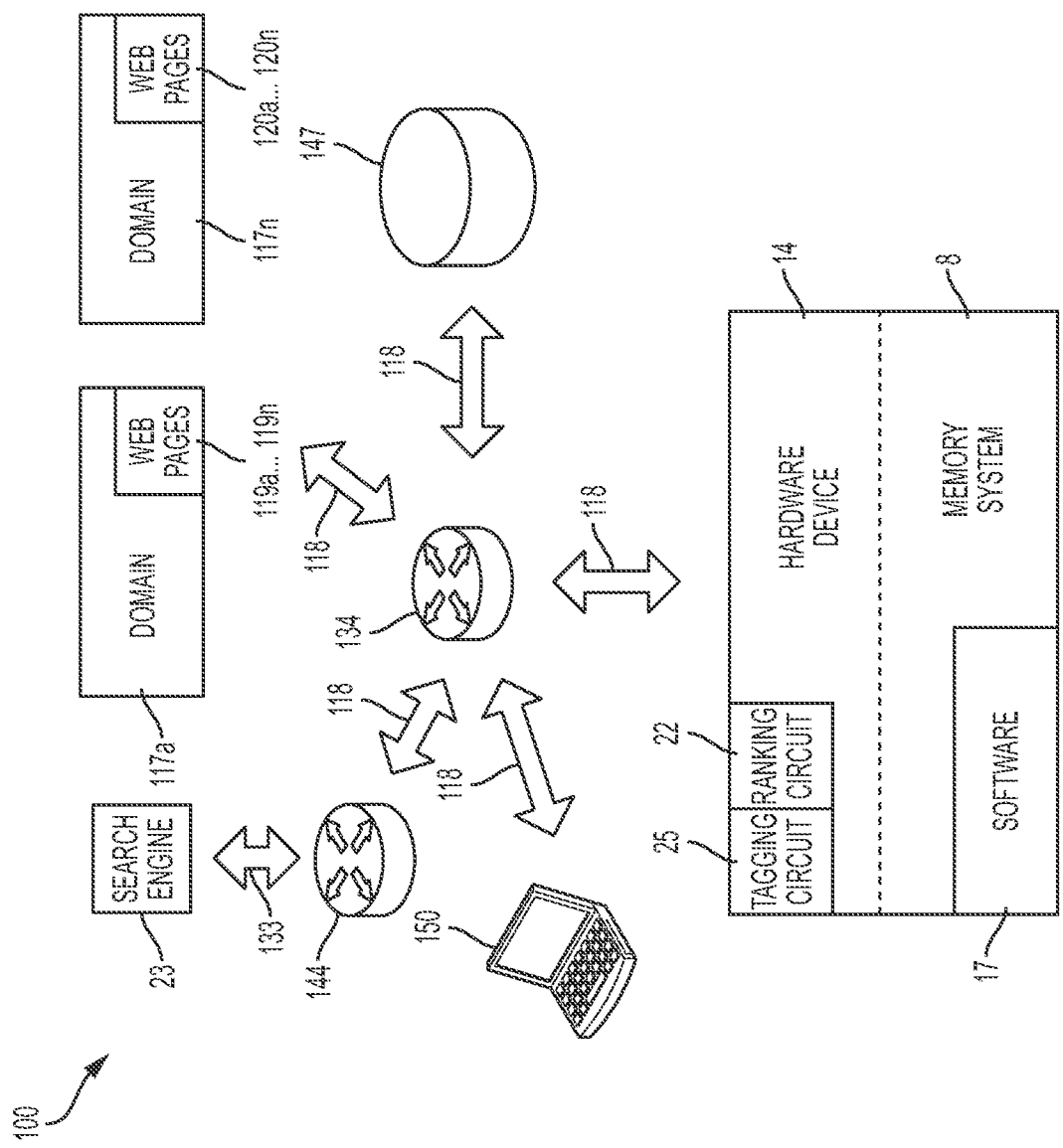
FIG. 1 illustrates a system for improving router search query technology by enabling router communications with respect to Web page searches, in accordance with embodiments of the present invention.

FIG. 1 illustrates a system 100 for improving router search query technology by enabling router communications with respect to Web page searches, in accordance with embodiments of the present invention. System 100 enables a process for improving Web based search results by identifying historical patterns for search queries associated with a network router 134. System 100 is enabled to identify a query received from network router 134 and enable a search engine 23 to analyze historical Web based queries associated with network router 134 for rendering search results accordingly. Additionally, tags associated with various domains (e.g., physics domain, computer domain, medical domain, etc.) are generated for tagging network router 134 with specific domains for refining search results.

During a Web search query, a search engine is executed with respect to a Web crawl process, an indexing process, and a retrieval process. The retrieval process enables a search engine to display relevant results from a search query executed by the user. A ranking algorithm compares the search query with respect to many (e.g., billions of Web pages) to determine a relevancy for each Web page. When a user executes a search query from a specified network, an associated network router forward the search query request to a search engine router and a response (with respect to available results) is transmitted back to a source router (e.g., network router 134) for routing back to the user's computer (e.g., computer 150) thereby allowing the search engine to define a search pattern (associated with the router address) associated with an associated search engine. If a specified search query is retrieved form a specified router, the search engine may retrieve a history of search queries from the router and render the results accordingly.

System 100 of FIG. 1 includes a search engine 23, domains 117a . . . 117n, a user computer 150, and a database 147 in communication with a hardware device 14 via a network router 134, a search engine router 144, and a network 118. Hardware device 14, network router 134, and search engine router 144 each may comprise an embedded computer. An embedded computer is defined herein as a remotely portable dedicated computer comprising a combination of computer hardware and software (fixed in capability or programmable) specifically designed for executing a specialized function. Programmable embedded computers may comprise specialized programming interfaces. Additionally, hardware device 14, network router 134, and search engine router 144 may each comprise a specialized hardware device comprising specialized (non-generic) hardware and circuitry (i.e., specialized discrete non-generic analog, digital, and logic based circuitry) for executing a process described with respect to FIGS. 1-9. The specialized discrete non-generic analog, digital, and logic based circuitry may include proprietary specially designed components (e.g., a specialized integrated circuit such as a tagging circuit 25 and ranking circuit 22 (as described, infra) designed for only implementing an automated process for enabling router communications with respect to Web page searches). Hardware device 14 includes a memory system 8, software 17, tagging circuit 25, and ranking circuit 22. The memory system 8 (e.g., a database) and database 147 may each include a single memory system. Alternatively, the memory system 8 and database 147 may each include a plurality of memory systems. Hardware device 14, network router 134, and search engine router 144 may comprise any type of hardware devices comprising embedded circuitry for only performing an automated process for enabling router communications with respect to Web page searches.

System 100 of FIG. 1 enables a Web page search query and ranking process as follows:

1. A retrieved Web page (e.g., of Web pages 119a . . . 119n) is identified, analyzed, and ranked with respect to additional Web pages (e.g., historical Web pages retrieved from database 147). The retrieved Web page is tagged (e.g., from tagging circuit 25) with an associated domain (e.g., domain 117a) associated with search engine 23. Subsequently, search engine 23 crawls through Websites (via the Internet) and scans all associated Web pages. The scanned Web pages are stored in database 147. Therefore, when a user initiates a search query, the search query is executed with respect to database 147 and determined results are transmitted back to the user. During an indexing process, each Web page is tagged with an associated domain as described, supra. For example, a query executed with respect to the term "eclipse" may return (as results) Web pages from a physics domain and from a software development domain. Therefore, each Web page is tagged with one or more domains.

2. A router address (for network router 134) is tagged with its associated domain retrieved from the search query. Therefore, when a user runs a query, search engine 23 will read the router address and the router is tagged in combination with the associated domain(s). Additionally, multiple domains associated with a single router may be ranked during a future timeframe. A router address may be additionally tagged with a domain comprising router page access information. If the router page access information is provided to the search engine (e.g., via an offline process such as a shipping of router logs or via a real time feed to the search engine, the router's address in the search engine is tagged with a domain associated with Web pages that were accessed through the router. Additionally, routers may be tagged to multiple domains due to a Web page volume associated with the routers. Therefore, top rated domains are prioritized such that they are linked based on a volume of traffic with respect to the Websites.

3. A Web page ranking process is executed while rendering results to a user based on a router address retrieved during a mapping process. The ranking process is initiated when a user transmits a query to a search engine with respect to a formula and/or specialized algorithm. In response, relevant documents are retrieved from an associated index. All available Web pages are transmitted to a page ranking circuit (e.g., ranking circuit 22). During a Web page ranking process, a domain tagged to the router address is determined and based on the determination a Web page ranking is determined. If a router address is tagged to software domains, then all domain related Web pages are ranked higher with respect to alternative domains.

Figure 2:
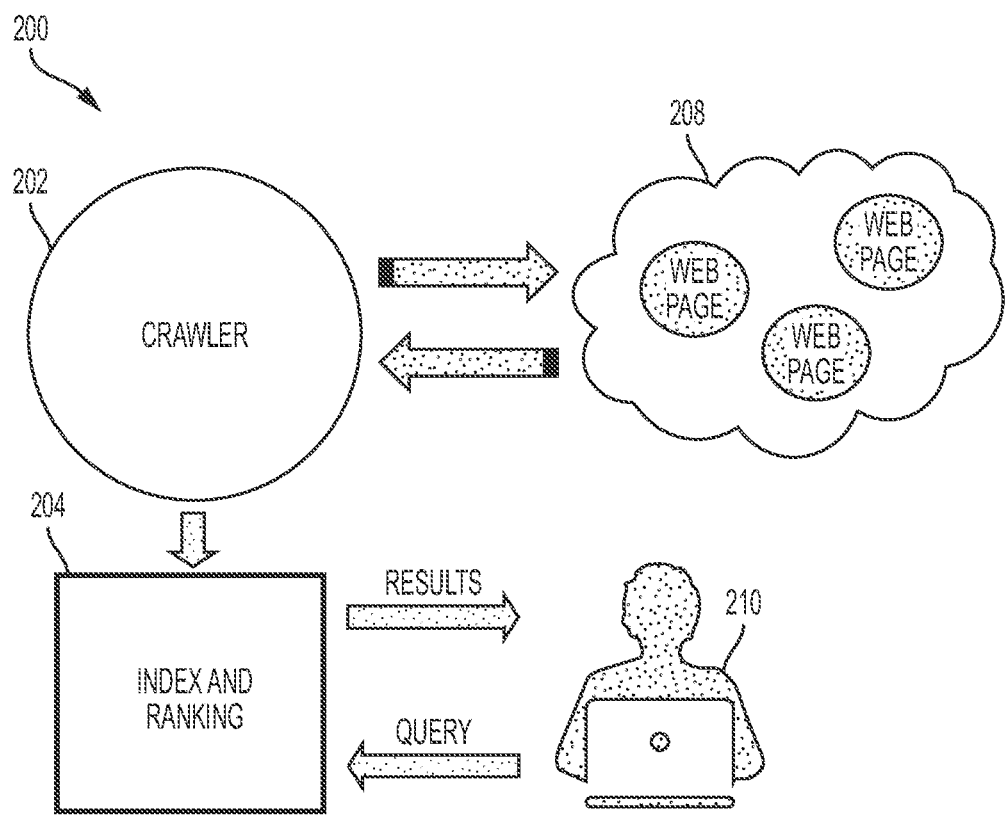
FIG. 2 illustrates a search engine process flow enabled by the system of FIG. 1, in accordance with embodiments of the present invention.

FIG. 2 illustrates a search engine process flow 200 enabled by system 100 of FIG. 1, in accordance with embodiments of the present invention. Search engines typically enable a Web crawler 202 (a software component enabled by a user 210) that searches through multiple Web pages 208 and indexes (via an index and ranking component 204) document/pages (of Web pages 208). Subsequently, index and ranking component 204 traverses through each Web link embedded in Web pages 208 to navigate and index all of web pages 208. Each of web pages 208 are indexed and ranked for relevance/validity etc. For example, Web crawler 202 is executed to perform a Web search with respect to multiple Web pages 208. Each of Web page is scanned and all scanned data is stored in a database such that when a user executes a query, the query is run with respect to the database and results are given back to user 210. Each page is sorted by contents and additional factors. In order to generate relevant results, a ranking process is performed. Ranking may be performed based on various factors such as, inter alia, Web page quality, a freshness of the Web page, user context, etc.

Figure 3:
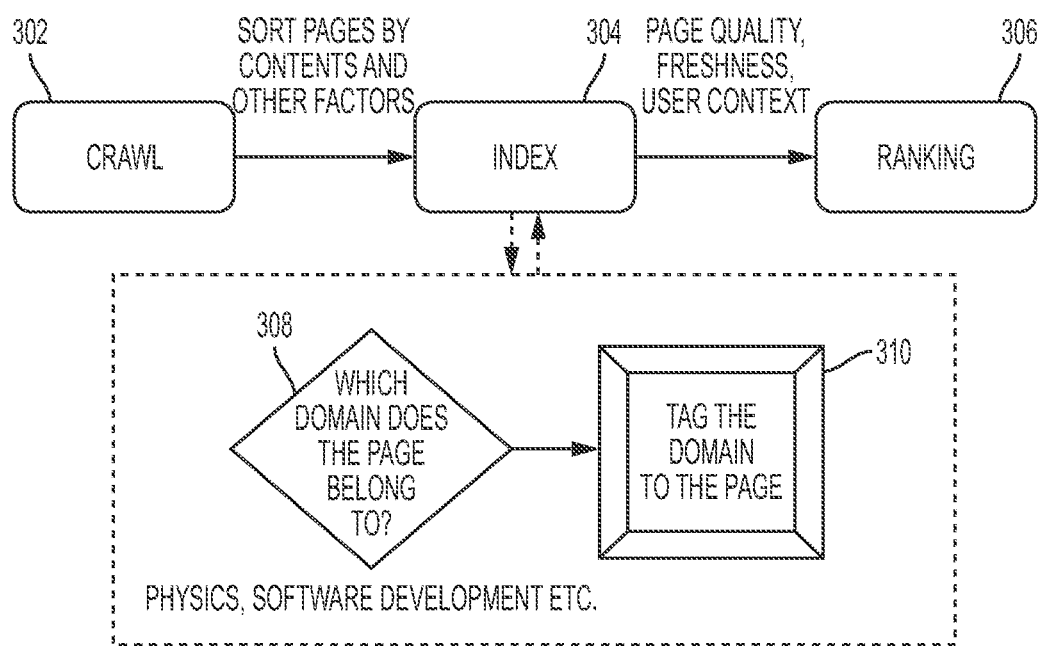
FIG. 3 illustrates an alternative search engine process flow enabled by the system of FIG. 1, in accordance with embodiments of the present invention.

FIG. 3 illustrates a search engine process flow 300 enabled by system 100 of FIG. 1, in accordance with embodiments of the present invention. In contrast with search engine process flow 200 of FIG. 2, search engine process flow 300 of FIG. 3 includes additional steps for executing a topic/domain extraction and tagging process. For example, each Web page may belong to multiple domains or topics (i.e., determined during a Web crawl 302). Therefore, the Web pages are tagged accordingly during an indexing process 304. The indexing process 304 comprises tagging each Web page with a domain to which it belongs. For example, if a search query is executed for the term "eclipse", the results might include Web pages from the domain of "physics" and the domain of "software development". Therefore, each Web page is tagged with one or more domains.

Figure 4A:
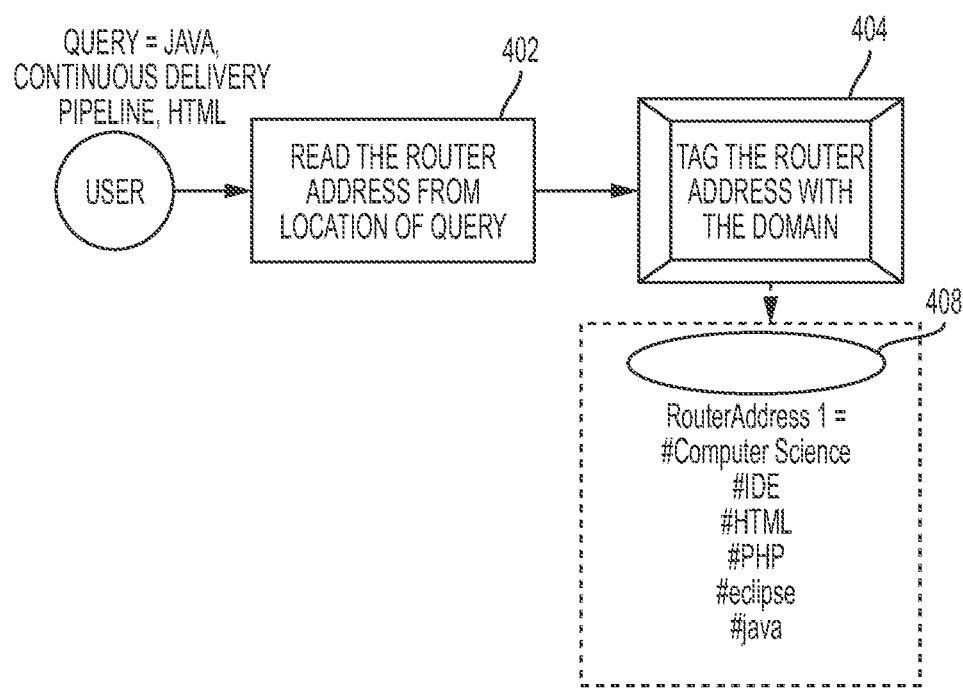
FIGS. 4A and 4B illustrate an overall search engine process flow enabled by the system of FIG. 1 for illustrating how a user search query allow routers to be tagged with domains, in accordance with embodiments of the present invention.
Figure 4B:
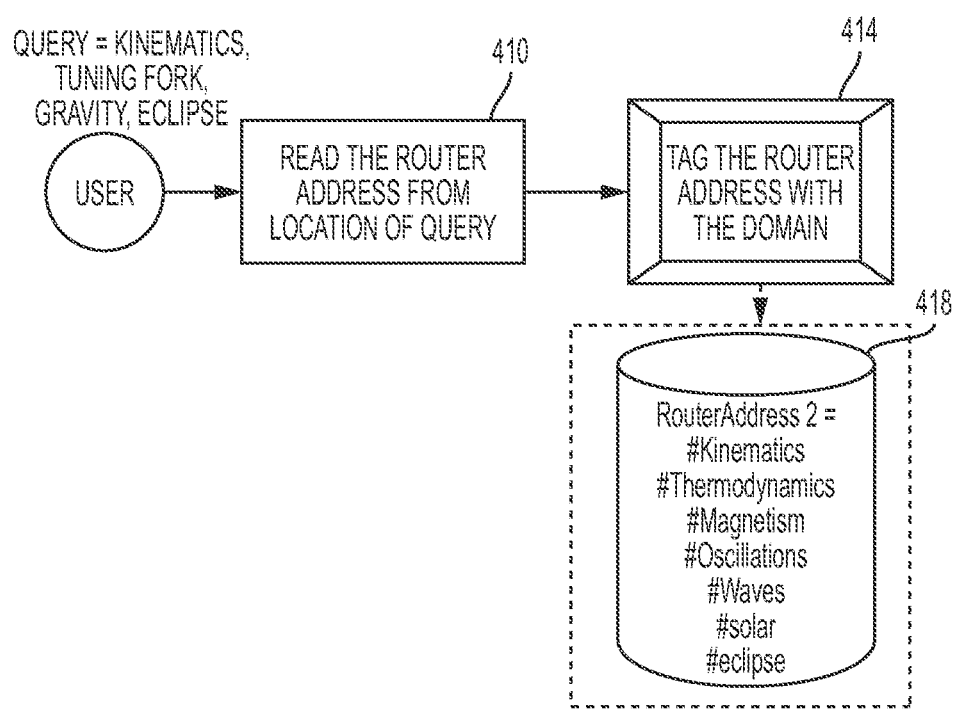

FIGS. 4A and 4B illustrate a search engine process flow enabled by system 100 of FIG. 1 for illustrating how a user search query allow routers to be tagged with domains, in accordance with embodiments of the present invention. FIGS. 4A and 4B illustrate two (example) differing domains being assigned to a router. For example, if a search query is executed for the term "eclipse", the results might include Web pages from an eclipse software site thereby indicating that the topic belongs to computer science such that the eclipse Web site is outputted from the Web crawler. Therefore, FIG. 4A illustrates that the search engine will read a router address (in step 402) associated with the search query and tag the router address to the Web page as follows: #computer science, #IDE, #eclipse, and #java. In step 404, the router address is tagged with the domain as follows: #Computer Science, #IDE, #HTML, #PHP, #eclipse, and #java. The aforementioned tagged router information is stored in a database 408.

FIG. 4B illustrates that the search engine will read a router address (in step 410) associated with the search query and tag the router address to the Web page as follows: # #Kinematics, tuning fork, gravity, and eclipse. In step 4414, the router address is tagged with the physics domain as follows: #Kinematics, #Thermodynamics, #Magnetism, #Oscillations, #Waves, #solar, and #eclipse. The aforementioned tagged router information is stored in a database 418.

Figure 5A:
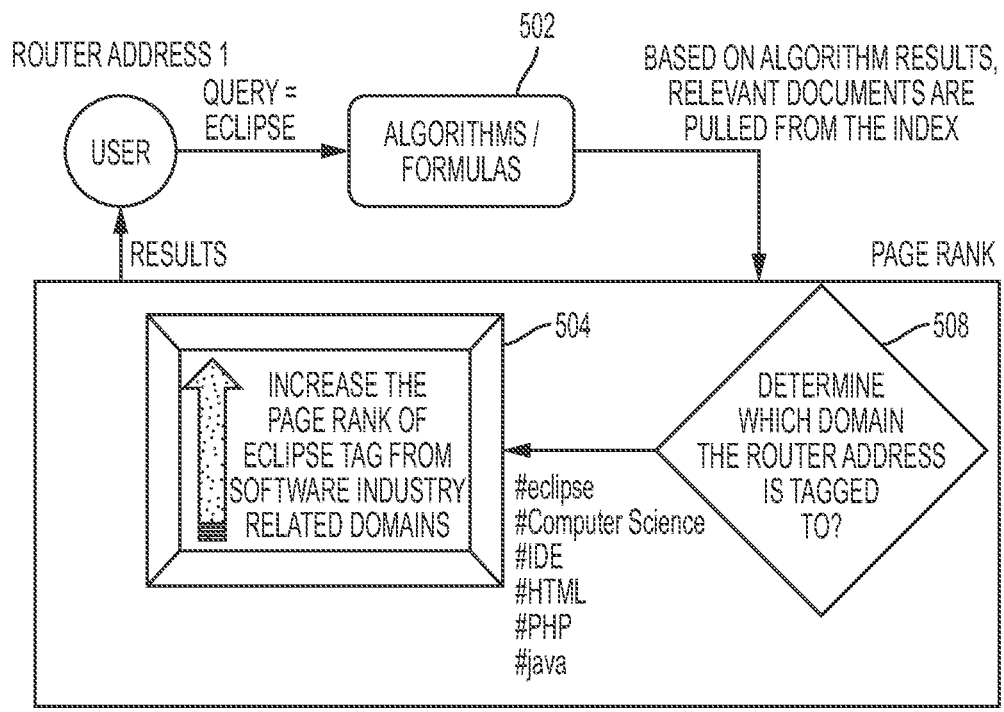
FIGS. 5A and 5B illustrate example user query process flows enabled by the system of FIG. 1, in accordance with embodiments of the present invention.
Figure 5B:
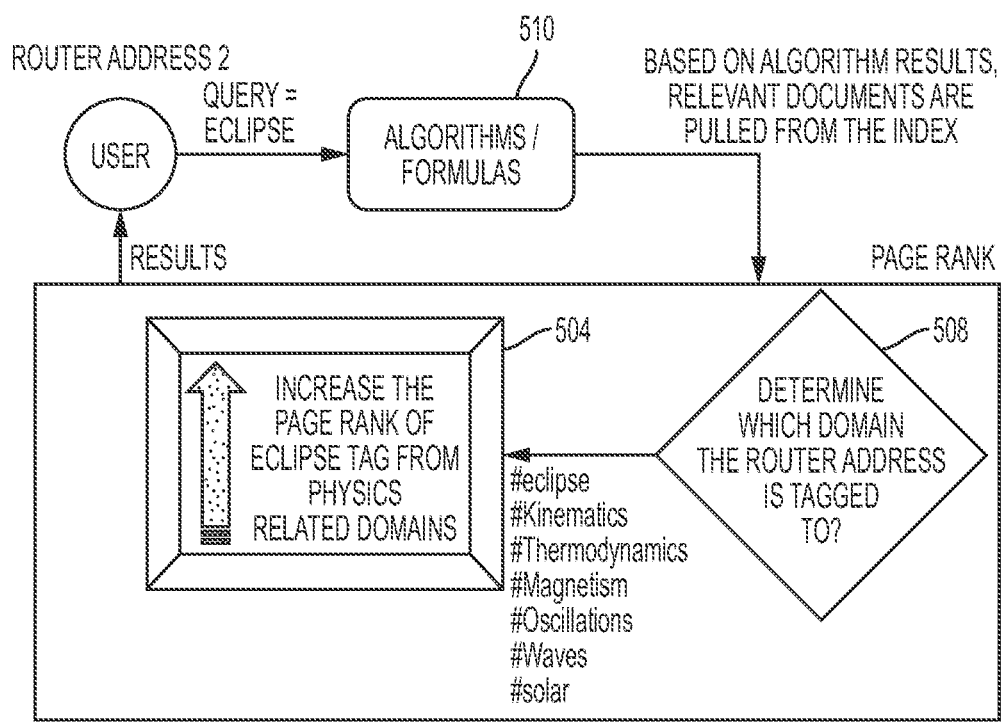

FIGS. 5A and 5B illustrate example user query process flows enabled by system 100 of FIG. 1, in accordance with embodiments of the present invention. FIGS. 5A and 5B illustrate a process associated with a user executing a search query for the term "eclipse". The search query is executed results are obtained from the search engine. An address for the router from which the query was executed is obtained and the tags for that router are fetched. Subsequently, the tags are used to rank and prioritize the search results from the search engine before returning results to the user. In page 8 and 9 you can see how the same query might provide different results for users from different routers.

FIG. 5A illustrates a first scenario for executing a search query for the term "eclipse". For example, in the software industry the term "eclipse" comprises software and in the physics field, the term "eclipse" comprises an astronomical event. Therefore, if a user is determined to be searching from a software company location, he/she is more likely to be expecting eclipse software results. In response (when results are fed in to a Web page ranking algorithm 502) by the search engine, a server determines domains to which the router address 1 (from where the query was executed from) was mapped in step 508. For example, the router address 1 may be tagged to software development related domains as follows: #Computer Science, #IDE, #HTML, #PHP, #eclipse, and #java. Since the search query is determined to be executed from the software development related domains, the search query is tagged with a higher priority for software as follows in step 504: #eclipse, #Computer Science, #IDE, #HTML, #PHP, and #java.

FIG. 5B illustrates a second scenario for executing a search query for the term "eclipse". In response (when results are fed in to a Web page ranking algorithm 510) by the search engine, a server determines domains to which the router address 2 (from where the query was executed from) was mapped in step 514. For example, a user from another router address 2 queries the same term "eclipse" and the search engine determines that an associated address is mapped to physics related domains in step 518 as follows: #Kinematics, #Thermodynamics, #Magnetism, #Oscillations, #Waves, and #solar. Therefore (with respect to scenario 1 and scenario 2), the search query remained the same with respect to the term "eclipse" but router address 1 was expecting eclipse software and router address 2 was expecting results for an astronomical (physics based) event.

Figure 6:
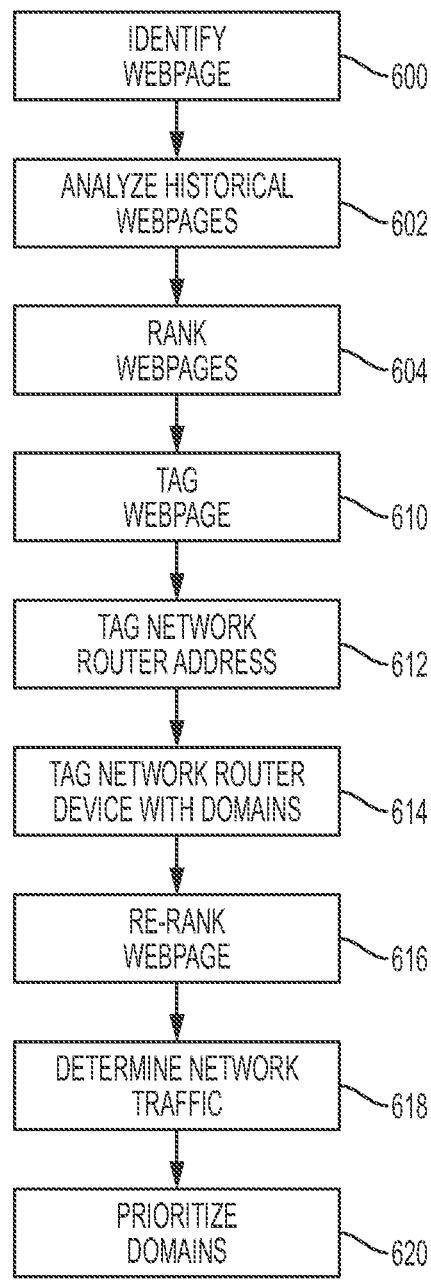
FIG. 6 illustrates an algorithm detailing a process flow enabled by the system of FIG. 1 for improving router search query technology by enabling router communications with respect to Web page searches, in accordance with embodiments of the present invention.

FIG. 6 illustrates an algorithm detailing a process flow enabled by system 100 of FIG. 1 for improving router search query technology by enabling router communications with respect to Web page searches, in accordance with embodiments of the present invention. Each of the steps in the algorithm of FIG. 6 may be enabled and executed in any order by a computer processor(s) or any type of specialized hardware executing specialized computer code. In step 600, a Web page retrieved during a Web query received from a network router device is identified. In step 602, historical Web pages retrieved during historical search queries associated with a search engine router and a network router device are analyzed. The analysis may include:
1. Determining a group of Web pages of the historical Web pages that are associated with the network router device.
2. Tagging the address for the network router device with historical domains comprising historical topics associated with the historical Web pages accessed via the network router device.

In step 604, the (identified) Web page (of step 200) is ranked with respect to the historical Web pages. In step 610, the Web page is tagged with a first domain (e.g., a software domain) comprising at least one topic associated with the Web page. In step 612, an address for the network router device is tagged with the first domain. In step 614, the address for the network router device is tagged with additional domains comprising additional topics associated with additional Web pages accessed via the network router device. In step 616, the Web page is re-ranked (based on the tagging of steps 610-614) with respect to the historical Web pages. The tagging processes of steps 610-614 may include open source tagging processes. The re-ranking process may include:
1. Executing a query with respect to a search engine performing the identification of step 600.

2. Retrieving the Web page and historical Web pages.

3. Using the first domain to perform the re-ranking.

In step 618, network traffic associated with each of the additional domains is determined. In step 620, the additional domains are prioritized with respect to the first domains based on the network traffic.

Figure 7:
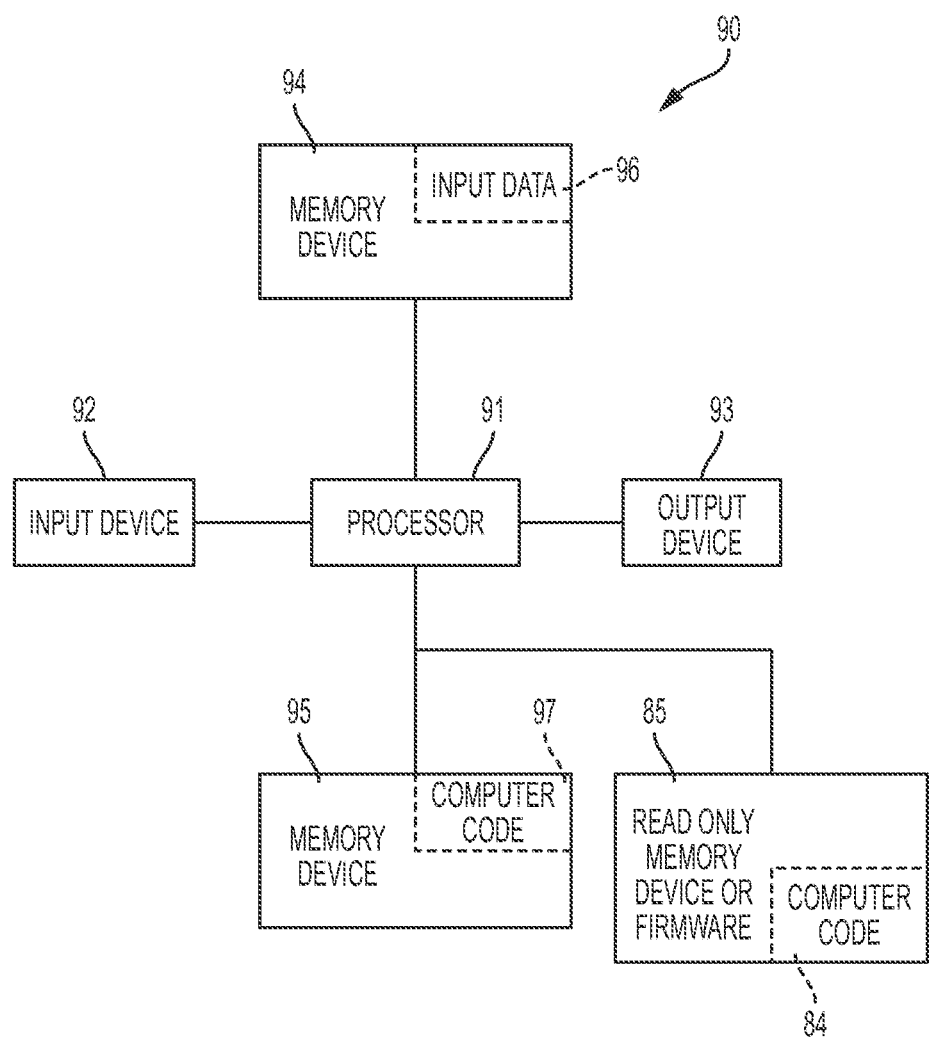
FIG. 7 illustrates a computer system used by or comprised by the system of FIG. 1 for improving router search query technology by enabling router communications with respect to Web page searches, in accordance with embodiments of the present invention.

FIG. 7 illustrates a computer system 90 (e.g., hardware device 14) used by or comprised by the system of FIG. 1 for improving router search query technology by enabling router communications with respect to Web page searches, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 7 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 6) for enabling a process for improving router search query technology by enabling router communications with respect to Web page searches. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms (e.g., the algorithms of FIG. 6) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithm of FIG. 6) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to enable a process for improving router search query technology by enabling router communications with respect to Web page searches. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for aggregating and digitally compressing multiple electronic events for network transmission. In another embodiment, the invention provides a business method that performs the process steps of the invention on a subscription, advertising, and/or fee basis. That is, a service supplier, such as a Solution Integrator, could offer to enable a process for improving router search query technology by enabling router communications with respect to Web page searches. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
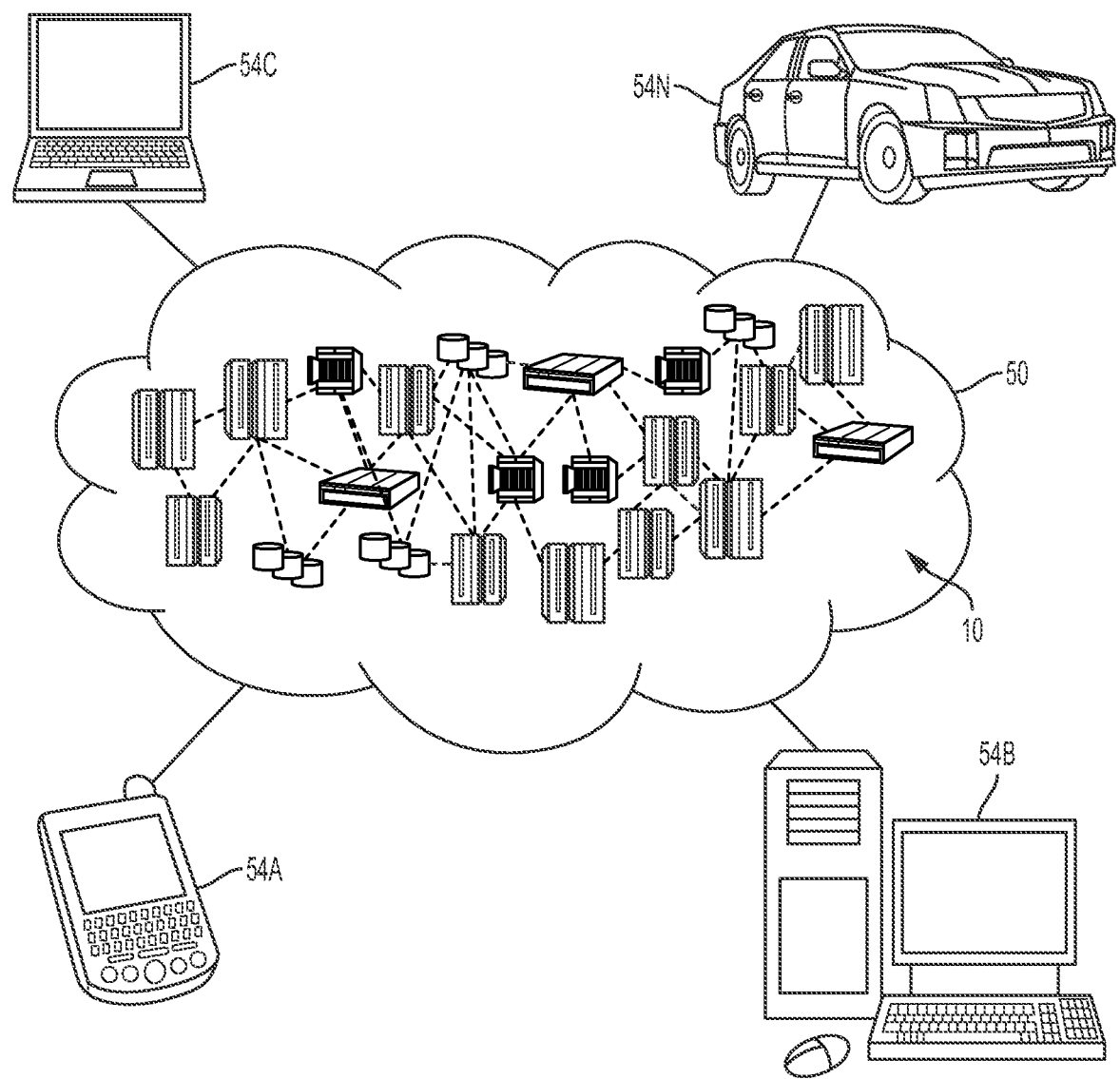
FIG. 8 illustrates a cloud computing environment, in accordance with embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 8 are intended to be illustrative only and that computing nodes 10 and cloud computing environment 50 can communicate with any type of computerized device over any type of network and/or network addressable connection (e.g., using a web browser).

Figure 9:
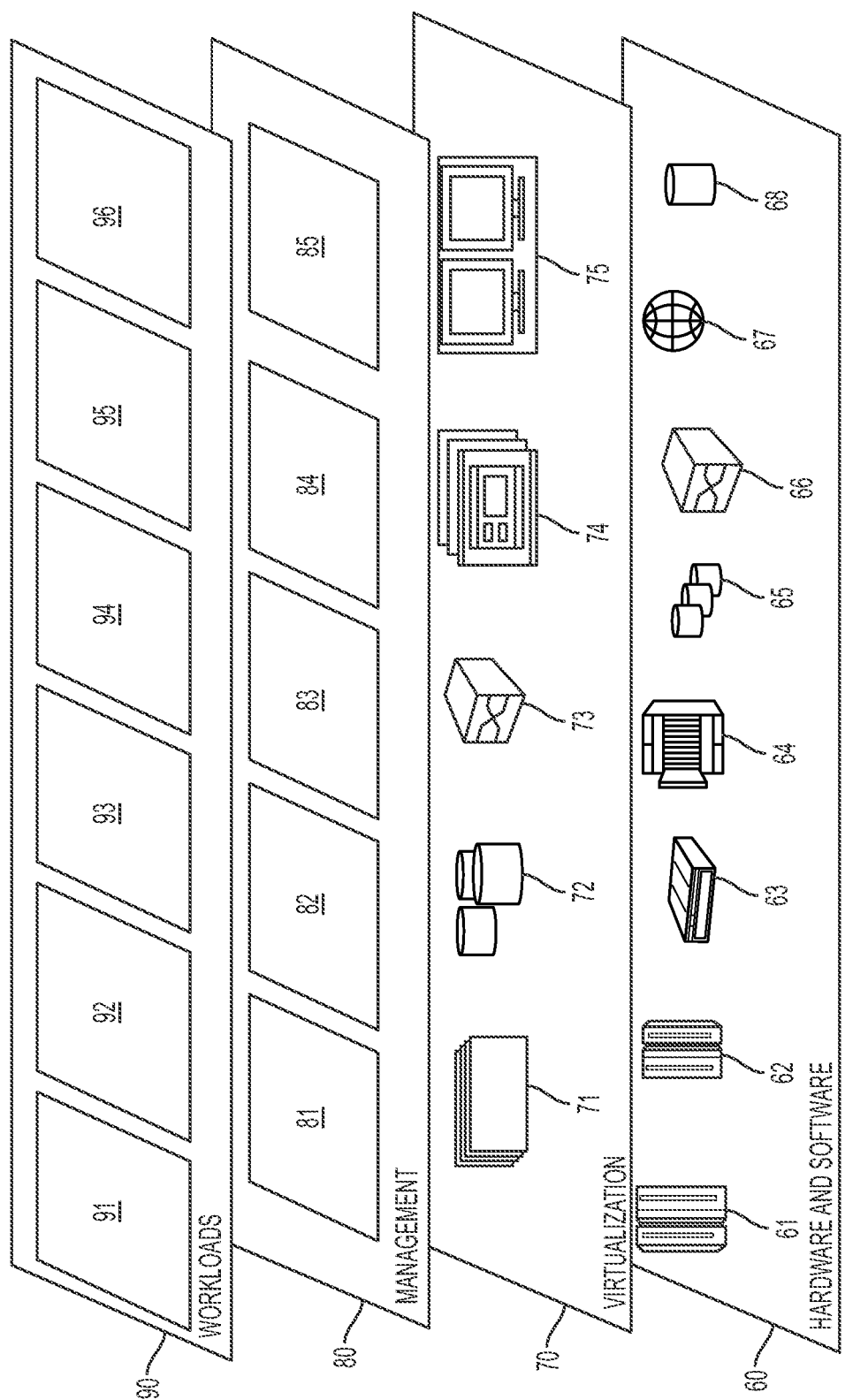
FIG. 9 illustrates a set of functional abstraction layers provided by the cloud computing environment, in accordance with embodiments of the present invention.

Referring now to FIG. 9, a set of functional abstraction layers provided by cloud computing environment 50 (see FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and enabling router communications with respect to Web page searches.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A router based search query improvement method comprising:
analyzing, by a processor of a hardware device executing a search engine associated with a search engine router, historical Web pages retrieved during historical search queries associated with said search engine router and a network router device, wherein said search engine is executed with respect to a Web crawl process, an indexing process, and a retrieval process;
scanning, by said processor, associated Webpages located during execution of said Web crawl process;
ranking, by said processor based on results of said analyzing, a Web page, retrieved during a Web query executed with respect to said associated Webpages and received from said network router device, with respect to said historical Web pages;
first tagging, by said processor, said Web page with a first domain comprising at least one topic associated with said Web page;
second tagging, by said processor, an address for said network router device with said first domain;
third tagging, by said processor, said address for said network router device with additional domains comprising additional topics associated with additional Web pages accessed via said network router device; and
re-ranking, by said processor based on results of said first tagging, said second tagging, and said third tagging, said Web page with respect to said historical Web pages.

2. The method of claim 1, further comprising:
determining, by said processor, network traffic associated with each of said additional domains; and
prioritizing, by said processor based on said network traffic, said additional domains with respect to said first domains.

3. The method of claim 2, further comprising:
fourth tagging, by said processor, said group of Web pages with a second domain associated with said group of Web pages; and
fifth tagging, by said processor, said address for said network router device with said second domain, wherein said re-ranking is further based on results of said fourth tagging and said fifth tagging.

4. The method of claim 1, wherein said analyzing comprises:
determining, by said processor a group of Web pages of said historical Web pages that are associated with said network router device; and
tagging, by said processor, said address for said network router device with historical domains comprising historical topics associated with said historical Web pages accessed via said network router device.

5. The method of claim 1, wherein information of said Web page is retrieved from said network router device during an offline process associated with logs of said network router device.

6. The method of claim 1, wherein information of said Web page is retrieved from said network router device during a real time feed from said network router device.

7. The method of claim 1, wherein said first tagging, said second tagging, and said third tagging each comprise an open source tagging process.

8. The method of claim 1, wherein said re-ranking comprises:
executing a query with respect to a search engine performing said identifying;
retrieving said Web page and said historical Web pages; and
using said first domain to perform said re-ranking.

9. The method of claim 1, wherein said first domain comprises a software based domain, and wherein said software domain is ranked higher than said additional domains.

10. The method of claim 1, further comprising:
providing at least one support service for at least one of creating, integrating, hosting, maintaining, and deploying computer-readable code in the hardware device, said code being executed by the computer processor to implement: said analyzing, said ranking, said first tagging, said second tagging, said third tagging, and said re-ranking.

11. A computer program product, comprising a computer readable hardware storage device storing a computer readable program code, said computer readable program code comprising an algorithm that when executed by a processor of a hardware device implements a router based search query improvement method, said method comprising:
analyzing, by said processor executing a search engine associated with a search engine router, historical Web pages retrieved during historical search queries associated with said search engine router and a network router device, wherein said search engine is executed with respect to a Web crawl process, an indexing process, and a retrieval process;
scanning, by said processor, associated Webpages located during execution of said Web crawl process;
ranking, by said processor based on results of said analyzing, a Web page, retrieved during a Web query executed with respect to said associated Webpages and received from said network router device, with respect to said historical Web pages;
first tagging, by said processor, said Web page with a first domain comprising at least one topic associated with said Web page;
second tagging, by said processor, an address for said network router device with said first domain;
third tagging, by said processor, said address for said network router device with additional domains comprising additional topics associated with additional Web pages accessed via said network router device; and
re-ranking, by said processor based on results of said first tagging, said second tagging, and said third tagging, said Web page with respect to said historical Web pages.

12. The computer program product of claim 11, wherein said method further comprises:
determining, by said processor, network traffic associated with each of said additional domains; and
prioritizing, by said processor based on said network traffic, said additional domains with respect to said first domains.

13. The computer program product of claim 11, wherein said analyzing comprises:
determining a group of Web pages of said historical Web pages that are associated with said network router device; and
tagging said address for said network router device with historical domains comprising historical topics associated with said historical Web pages accessed via said network router device.

14. The computer program product of claim 13, wherein said method further comprises:
- fourth tagging, by said processor, said group of Web pages with a second domain associated with said group of Web pages; and
- fifth tagging, by said processor, said address for said network router device with said second domain, wherein said re-ranking is further based on results of said fourth tagging and said fifth tagging.

15. The computer program product of claim 11, wherein information of said Web page is retrieved from said network router device during an offline process associated with logs of said network router device.

16. The computer program product of claim 11, wherein information of said Web page is retrieved from said network router device during a real time feed from said network router device.

17. The computer program product of claim 11, wherein said first tagging, said second tagging, and said third tagging each comprise an open source tagging process.

18. The computer program product of claim 11, wherein said re-ranking comprises:
- executing a query with respect to a search engine performing said identifying;
- retrieving said Web page and said historical Web pages; and
- using said first domain to perform said re-ranking.

19. The computer program product of claim 11, wherein said first domain comprises a software based domain, and wherein said software domain is ranked higher than said additional domains.

20. A hardware device comprising a processor coupled to a computer-readable memory unit, said memory unit comprising instructions that when executed by the processor executes a router based search query improvement method comprising:
- analyzing, by said processor executing a search engine associated with a search engine router, historical Web pages retrieved during historical search queries associated with said search engine router and a network router device, wherein said search engine is executed with respect to a Web crawl process, an indexing process, and a retrieval process;
- scanning, by said processor, associated Webpages located during execution of said Web crawl process;
- ranking, by said processor based on results of said analyzing, a Web page, retrieved during a Web query executed with respect to said associated Webpages and received from said network router device, with respect to said historical Web pages;
- first tagging, by said processor, said Web page with a first domain comprising at least one topic associated with said Web page;
- second tagging, by said processor, an address for said network router device with said first domain;
- third tagging, by said processor, said address for said network router device with additional domains comprising additional topics associated with additional Web pages accessed via said network router device; and
- re-ranking, by said processor based on results of said first tagging, said second tagging, and said third tagging, said Web page with respect to said historical Web pages.

* * * * *